United States Patent Office 2,710,370
Patented June 7, 1955

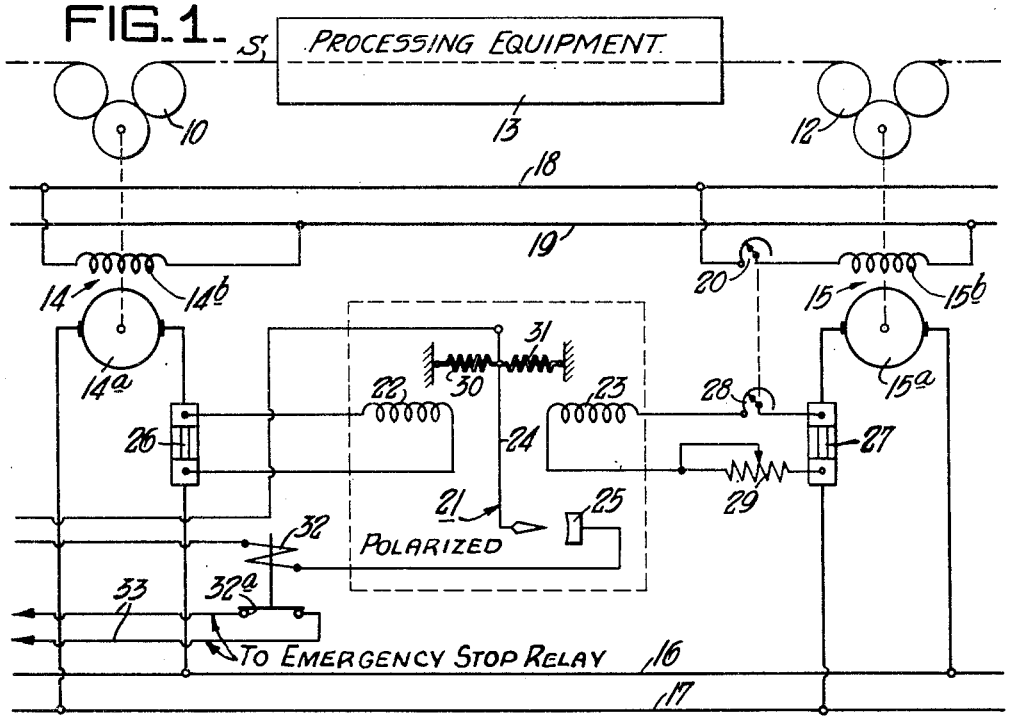
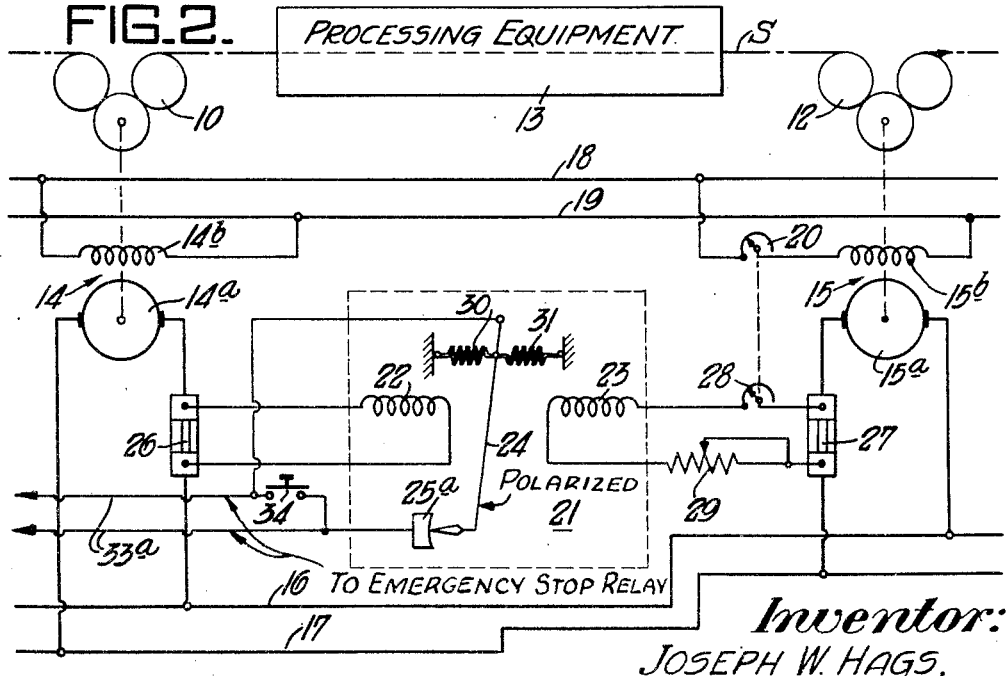

2,710,370

SAFETY DEVICE FOR ELECTRIC MOTOR DRIVEN STRIP PROCESSING LINE

Joseph W. Hags, North Huntingdon Township, Westmoreland County, Pa., assignor to United States Steel Corporation, a corporation of New Jersey Application October 28, 1952, Serial No. 317,237

4 Claims. (Cl. 318—6)

This invention relates to improved safety devices for automatically stopping strip processing lines in the event the strip breaks.

In operating a strip processing line, it is often necessary to maintain portions of the strip under tension, which may approach the ultimate tensile strength of the material. Such tension commonly is developed by passing the strip first through a drag bridle and farther along through a "pull-through" or drive bridle. The two bridles are powered electrically and they tension the portion of the strip which lies between them. For example, in electrolytic tinning lines untensioned strip commonly travels from an uncoiler to a crop shear, a welder, looping pits and gauges and then through the drag bridle. Beyond there the strip is under tension and travels in a tortuous path through the cleaning, pickling, plating, and drying equipment and then through the drive bridle. Variations in cross sectional area, quality or processing conditions readily cause a strip to break when the tension therein approaches the ultimate strength. Unless the line is stopped immediately after a break occurs, a considerable amount of strip can pile up behind the break, while the segment ahead continues on through the line untensioned. Consequently there is a considerable loss both in operating time and product, which loss is aggravated the longer the delay before the line stops.

An object of the present invention is to provide improved safety devices of simplified construction and applicable to any standard existing line with a minimum of additional equipment for immediately stopping the line when the strip breaks.

A more specific object is to provide improved safety devices of the foregoing type, which devices include only a simple balancing relay connected between the operating circuits for the two bridle motors.

In accomplishing these and other objects of the invention, I have provided improved details of structure, preferred forms of which are shown in the accompanying drawing, in which:

Figure 1 is a wiring diagram of one form of the invention; and

Figure 2 is a wiring diagram of a modified form of the invention.

The drawing shows schematically a portion of a strip processing line which includes a drag bridle 10, a "pull-through" or drive bridle 12, and processing equipment 13 between said bridles. The drag and drive bridles have direct current dynamo-electric machines 14 and 15 respectively, which include armatures 14a and 15a and separately excited fields 14b and 15b. Both armatures are shown connected to bus bars 16 and 17 from a speed control generator, not shown. Both fields are shown connected to D. C. power lines 18 and 19. However, the arrangement of fields and the mode of connecting the motors is illustrative only. For convenience in the ensuing description and claims, I refer to both dynamo-electric machines 14 and 15 as "motors," even though that connected to the drag bridle more often functions as a generator. The current through the field 14b of the drag bridle motor 14 is constant, but that through the field 15b of the drive bridle motor can be varied by adjustment of a variable resistor 20 in series therewith. In accordance with well known principles, the greater the resistance the faster the motor runs. Thus the resistor 20 affords a means for controlling the bridle speed.

Strip S travels from left to right through the drag bridle 10, the processing equipment 13 and the drive bridle 12. The two bridles tension the portion of the strip which lies between them. When the line operates normally, the drive bridle pulls the strip to the right with sufficient force and speed to turn the drag bridle in opposition to force exerted thereon by dynamo-electric machine 14. The latter motor thus acts as a dynamic brake or a generator and returns current from its armature 14a to the bus bars 16 and 17. If the strip S breaks, the dynamo-electric machine 14 commences to motorize and the current through its armature reverses direction.

The mechanism thus far described is well known and forms only the environment for the present invention. Therefore no more detailed description is deemed necessary.

Figure 1 shows an embodiment of the present invention in which a balancing relay 21 is connected between the armature circuits of the two motors. This relay includes two spaced apart coils 22 and 23, a polarized movable contact 24 situated between said coils, and a fixed contact 25 situated adjacent the coil 23 and adapted to be engaged by said movable contact. The circuit to the armature 14a of the drag bridle motor contains an ammeter shunt 26 and the coil 22 is connected in parallel therewith. Similarly the circuit to the armature 15a of the drive bridle motor contains an ammeter shunt 27 with which the coil 23 is connected in parallel. A pair of variable resistors 28 and 29 are connected in series with the coil 23. The resistor 28 is mechanically connected with the resistor 20 in the circuit to the field 15 of the drive bridle motor, whereby any adjustments in the field current automatically are reflected in the circuit to the coil 23. The resistor 29 forms a means for adjusting the balance point of the relay. A pair of centering springs 30 and 31 are connected to the movable contact 24 for normally holding it centered in the absence of magnetic forces from the coils.

The direction of current through the armature 15a of the drive bridle motor is always the same. Consequently the direction of current through the coil 23 and the polarity of the magnetic flux of this coil remain the same. The direction of current through the armature 14a of the drag bridle motors is reversible, depending on whether this motor operates as a generator or a motor. Consequently the direction of current through the coil 22 and the polarity of the magnetic flux of this coil likewise can reverse. When the processing line operates normally (i. e., the drag bridle motor operates as a generator), the polarity of the magnetic flux of the coils 22 and 23 acting on the movable contact 24 is opposite and both coils attract this contact. If the strip S breaks and the drag bridle motor commences to operate as a motor, the polarity of the magnetic flux of the coil 22 acting on the movable contact 24 reverses and becomes the same as that of the coil 23. Now the coil 22 repels the movable contact, while the coil 23 still attracts it; consequently the contact moves toward the latter coil.

In this embodiment the circuits to the coils 22 and 23 are adjusted so that under normal operating conditions these coils attract the movable contact 24 with equal force. This adjustment is attained with the variable resistor 29. Any adjustment in the speed of the drive bridle motor 15 would tend to change the current through the coil 23, but the mechanical connection between the resistors 20 and 28 automatically compensates for speed adjustments in this motor. Consequently the movable contact 24 normally remains centered between the two coils away from the fixed contact 25, which position is shown in Figure 1. If the strip S breaks, the movable contact closes against the fixed contact and the coil 23 temporarily holds it in this latter position.

The contacts 24 and 25 are connected in series with the coil of a relay 32 supplied with power from any suitable source. The relay has a set of normally closed contacts 32a which are connected in an emergency stop circuit 33. When contacts 24 and 25 close, they complete a circuit through the relay coil and the resultant energization of the relay opens the contacts 32a and breaks the emergency stop circuit, which stops the processing line. The emergency stop circuit can be of any standard form which locks itself out until the processing line is properly reset. As soon as the current to the motors stops, the coils 22 and 23 are deenergized. Thereupon the springs 30 and 31 return the movable contact 24 to its normal centered position and thus the balancing relay resets automatically.

Figure 2 shows a modification in which the relative strengths of the coil circuits are adjusted somewhat differently. Again the figure shows the parts in their normal operating position. In this modification the fixed contact 25a is situated adjacent the coil 22. The circuits to the coils are adjusted so that under normal operating conditions the coil 22 attracts the movable contact 24 with sufficiently greater force than the coil 23 that it holds this contact in engagement with the fixed contact 25a. If the strip S breaks and reverses the polarity of the flux of the coil 22, this coil repels the movable contact the same as in Figure 1, except that now the movable contact disengages the fixed contact. Again the coil 23 holds the movable contact in its new position. The contacts 24 and 25a are connected directly in an emergency stop circuit 33a so that on opening they break this circuit and stop the processing line.

In this modification a normally open start switch 34 is connected in the emergency stop circuit 33a parallel with the contacts 24 and 25a. When the processing line is started, the latter contacts are open. The start switch 34 is held closed manually until the drag bridle motor 14 commences operating as a generator and the flux of coil 22 builds up sufficiently to close contacts 24 and 25a. Thereafter the start switch is released so that the safety device can function if needed.

From the foregoing description it is seen that the present invention provides a simple means for automatically and immediately stopping a strip processing line if the strip breaks. The device can be installed readily on existing lines without otherwise altering their structure or operation.

While I have shown only certain preferred forms of the invention, it is apparent that modifications may arise. Therefore I do not wish to be limited to the disclosure set forth but only by the scope of the appended claims.

I claim:

1. In a strip processing line which includes drag and drive bridles adapted to tension a portion of a strip between them and respective motors connected to said bridles, the combination with said motors of a safety device for stopping the line in the event the strip breaks comprising a coil connected to the circuit of the drag bridle motor and adapted to produce a magnetic flux the polarity of which reverses from normal if the strip breaks, a coil connected to the circuit of the drive bridle motor and spaced from said first named coil, a movable contact situated between said coils, a fixed contact cooperable with said movable contact, and an emergency stop circuit controlled by said contacts, the flux from said coils normally acting in opposite directions on said movable contact to hold it in a position with respect to said fixed contact in which said stop circuit is closed, a flux reversal in said first named coil changing the direction in which this coil acts on said movable contact to change its position with respect to said fixed contact and open said stop circuit.

2. A combination as defined in claim 1 in which under normal operating conditions said movable contact is centered between said coils out of engagement with said fixed contact, and when the strip breaks said movable contact engages said fixed contact.

3. A combination as defined in claim 1 in which under normal operating conditions said movable contact is held adjacent said first named coil in engagement with said fixed contact, and when the strip breaks said movable contact moves out of engagement with said fixed contact.

4. In a strip processing line which includes drag and drive bridles adapted to tension a portion of a strip between them, respective motors connected to said bridles, and an emergency stop circuit adapted when opened to stop the line, the combination with said motors and emergency stop circuit of a device for controlling the latter comprising a coil connected to the circuit of the drag bridle motor, a second coil connected to the circuit of the drive bridle motor and spaced from said first named coil, a movable contact situated between said coils, and a fixed contact cooperable with said movable contact, said contacts being connected in said emergency stop circuit, said coils normally providing magnetic forces which act in opposition on said movable contact and hold it in a position with respect to said fixed contact in which said emergency stop circuit is closed, the magnetic force with which said first named coil acts on said movable contact changing with current changes in the drag bridle motor circuit to move this contact with respect to said fixed contact for opening said emergency stop circuit.

References Cited in the file of this patent

UNITED STATES PATENTS

| 2,060,647 | Umansky | Nov. 10, 1936 |
| 2,082,816 | Adams et al. | June 8, 1937 |
| 2,168,777 | McCreary | Aug. 8, 1939 |
| 2,214,617 | Kenyon | Sept. 10, 1940 |
| 2,315,869 | Montgomery | Apr. 6, 1943 |
| 2,586,412 | Winchester | Feb. 19, 1952 |
| 2,594,035 | King et al. | Apr. 22, 1952 |

FOREIGN PATENTS

| 878,624 | France | Oct. 19, 1942 |